United States Patent [19]

Bernadic et al.

[11] Patent Number: 5,000,626

[45] Date of Patent: Mar. 19, 1991

[54] CUTTING INSERT FOR LOW RANGES OF FEED AND DEPTH OF CUT

[75] Inventors: Thomas Bernadic, Madison Heights; Prasad Boppana, Troy; Brendan Brockett, Dearborn Heights; Karl Katbi, Troy; Tony Lowe, Royal Oak; John Patterson, Hazel Park; Yefim Val, Troy, all of Mich.

[73] Assignee: GTE Valenite Corporation, Troy, Mich.

[21] Appl. No.: 288,493

[22] Filed: Dec. 22, 1988

[51] Int. Cl.$^5$ .............................................. B23B 27/22
[52] U.S. Cl. .................................... 407/114; 407/116
[58] Field of Search ................. 407/113, 114, 115, 116

[56] References Cited

U.S. PATENT DOCUMENTS

| | | | |
|---|---|---|---|
| Re. 32,636 | 4/1988 | Stashko | 407/114 |
| 3,399,442 | 9/1968 | Jones et al. | 29/95 |
| 3,733,644 | 5/1973 | Sanders | 15/256.53 |
| 3,786,540 | 1/1974 | Lundgren | 29/95 |
| 3,786,541 | 1/1974 | Lundgren | 29/95 |
| 3,841,785 | 10/1974 | Werther | 408/197 |
| 3,866,282 | 2/1975 | Lundgren | 29/95 |
| 3,882,580 | 5/1975 | Lundgren | 407/116 |
| 3,885,281 | 5/1975 | Stambler | 29/95 |
| 3,968,550 | 7/1976 | Gehri | 29/95 |
| 4,056,871 | 11/1977 | Bator et al. | 407/114 |
| 4,087,192 | 5/1978 | Hertel | 407/114 |
| 4,215,957 | 8/1980 | Holma et al. | 407/114 |
| 4,218,160 | 8/1980 | Arnold | 407/114 |
| 4,273,480 | 6/1981 | Shiral et al. | 407/114 |
| 4,318,645 | 3/1982 | McCreery | 407/116 |
| 4,334,808 | 5/1982 | Seidel | 407/114 |
| 4,335,984 | 6/1982 | Zweekly | 407/114 |
| 4,340,324 | 7/1982 | McCreery | 407/114 |
| 4,359,300 | 11/1982 | Hazra et al. | 407/114 |
| 4,367,990 | 1/1983 | Porat | 407/114 |
| 4,411,565 | 10/1983 | Hazra et al. | 407/114 |
| 4,479,744 | 10/1984 | Stricker | 407/114 |
| 4,507,024 | 3/1985 | Stashko | 407/114 |
| 4,561,809 | 12/1985 | Porat et al. | 407/114 |
| 4,597,696 | 7/1986 | Maeda et al. | 407/114 |
| 4,626,141 | 12/1986 | Malaker et al. | 407/114 |
| 4,685,844 | 8/1987 | McCreery et al. | 407/115 |
| 4,705,434 | 11/1987 | Patterson et al. | 407/114 |
| 4,787,784 | 11/1988 | Bernadic et al. | 407/116 |
| 4,859,112 | 8/1989 | Patterson et al. | 407/116 |

Primary Examiner—James G. Smith
Assistant Examiner—Blynn Shideler
Attorney, Agent, or Firm—Bill C. Panagos

[57] ABSTRACT

An indexable cutting insert of the type having a corner radius and a corner angle adapted for finishing operations comprises a pair of substantially parallel spaced apart faces and at least one peripheral side surface being substantially normal to said faces. A pair of straight cutting edge extend away from the corner at the juncture of the peripheral side surface and a plane positioned closely adjacent and below the juncture of a respective face. To break the chips formed during cutting, a chip breaker recess extents rearwardly and along the cutting edges. The chip breaker recess includes a descending control surface leading to the bottom of the recess followed by an ascending control surface. The descending control surface comprises a first and second planar descending control surface with the first surface being at a shallow angle and the second surface being at a steep angle. The ascending surface directs the chip upwardly toward a central island formed within the plane of a respective face and away from the insert and the cutting edge. The chip breaker recess incorporates an additional shallow chip control recess formed by a raised land extending outwardly toward a corner from the central island along a bisector of a respective corner and a raised bottom surface extending above the bottom of the main chip breaker recess and around the corner. The additional chip control surfaces forming the shallow recess include an ascending corner chip control surface extending upwardly from the raised corner bottom control surface at a relatively steep angle. The recess is configured to change the curling motion of the chip at various depths of cut to enhance the chip breaking forces.

11 Claims, 4 Drawing Sheets

CUTTING INSERT FOR LOW RANGES OF FEED AND DEPTH OF CUT

FIELD OF THE INVENTION

The present invention relates to indexable cutting inserts having an improved chip breaker form that is particularly desirable for low ranges of feed and depth of cut.

BACKGROUND OF THE INVENTION

Indexable cutting inserts for detachable mounting on a tool holder, are generally made of cemented carbide material or ceramic material and are formed by hot pressing or cold pressing and sintering techniques. These inserts typically are available in standard sizes and frequently employ chip breaker control surfaces in the form of a recess extending around the peripheral edge of the insert to break chips as they are formed during a cutting operation.

Modern N/C machining operations in automated factories put high demand on reliable chip flow, durable tool life, and lower machining costs. General purpose chip breakers and chip breaker provided on negative rake inserts do not produce acceptable chip forms and exhibit chipping in machining ductile materials at high speeds and low ranges of feed and depth of cut.

When machining a ductile material at high speeds, a stationary plastic deformation occurs in the shear zone and the formed chip is continuous and straight with smooth flow on the face of the tool. At low ranges of feed and depth of cut, the continuous straight chip is thin and narrow, therefore, it requires an additional deformation to break. In other words, a higher breaking strain is required. The present invention is directed to an insert which enhances the breakage of thin and narrow chips which are generally created under conditions of low feed and light depths of cut.

U.S. Pat. No. 4,685,844 to McCreery describes an indexable and invertible cutting insert having cutting edges and a positive rake surface which appears convex when viewed in cross section.

U.S. Pat. No. 4,214,845 to Yoshikatsu describes a polygonal throw away insert including an insert body having two opposite, parallel major surfaces and a plurality of sides. A cutting edge is formed along a line where each of the sides joins each of the surfaces. A ramp extends from each cutting edge downwardly towards the center of at least one of the two major surfaces of the insert body. A pair of first chip breaking projections are provided on the ramp adjacent each corner of the insert body in a symmetrical relationship with respective to the bisector of the corner and a second chip breaking projection is provided on the bisector behind the first projections.

U.S. Pat. No. 3,815,192 to Ohtsu describes a polygonal throw away insert to be detachably mounted in a tool holder having a plurality of cutting edges on one major surface of the insert body along the edges of all the sides thereof and a plurality of projection rows provided on said major surface along and spaced from the cutting edges so as to form chip breakers. Adjacent projections in each projection row define chip curling zones therebetween.

SUMMARY OF THE INVENTION

It is an object of the present invention to provide a chip form for an insert which promotes breaking strain for thin and narrow chips over a wide range of operations which are encountered in different metal removal industries.

It is a further object of the present invention to configure the chip breaker so a ductile chip breaks at moderate to high speeds and low ranges of feed and depth of cut.

It is a further object of the present invention to lower the cutting forces while generating less wear and achieve improved tool life.

It is a further object of the present invention to achieve durable tool life and good to excellent resistance to crater and edge build-up.

It is an object of the present invention to obviate one or more disadvantages of the prior art.

Other and further objects of the present invention will be apparent to one of ordinary skill in the art from reading of the detailed specification.

With the insert of the present invention, the chip breaker recess is configured to achieve enhanced chip breaking at feed rates on the order of about 0.005 to about 0.200 inch per revolution and depth of cut on the order of from about 0.010 to about 0.125. The chip which is formed during cutting is influenced by the configuration of the control surfaces forming the chip breaker. Typically, a chip flowing over the cutting edge, first encounters a descending control surface. The flowing chip next encounters the bottom of the chip breaker recess followed by an ascending control surface which directs the chip upwardly and outwardly. In the present invention, the chip breaker recess incorporates additional corner chip control surfaces formed by a raised land extending outwardly toward a corner from the central island along a bisector of a respective corner and a raised bottom surface. The additional corner chip control surfaces form a shallow groove which enhances the plastic deformation of chips at light depths of cut less than 0.05 inch.

In accordance with the present invention, an indexable cutting insert of the type having a corner radius and a corner angle adapted for finishing operations comprises a pair of substantially parallel spaced apart faces and at least one peripheral side surface being substantially normal to said faces. A pair of straight cutting edge extend away from the corner at the juncture of the peripheral side surface and a plane positioned closely adjacent and below the juncture of a respective face. To break the chips formed during cutting, a chip breaker recess extents rearwardly and along the cutting edges. The chip breaker recess includes a descending control surface leading to the bottom of the recess followed by an ascending control surface. The descending control surface comprises a first and second planar descending control surface with the first surface being at a shallow angle and the second surface being at a steep angle. The ascending surface directs the chip upwardly toward a central island formed within the plane of a respective face and away from the insert and the cutting edge. In the present invention, the chip breaker recess incorporates additional shallow chip control recess formed by a raised land extending outwardly toward a corner from the central island along a bisector of a respective corner and a raised bottom surface extending above the bottom of the main chip breaker recess and around the corner. The additional chip control surfaces forming the shallow recess include an ascending corner chip control surface extending upwardly from the raised corner bottom control surface at a relatively steep angle. The recess is configured to change the curling motion of the chip at various depths of cut to enhance the chip breaking forces.

DETAILED DESCRIPTION OF THE DRAWINGS

DETAILED DESCRIPTION OF THE PREFERRED EMBODIMENT

Figure 1:
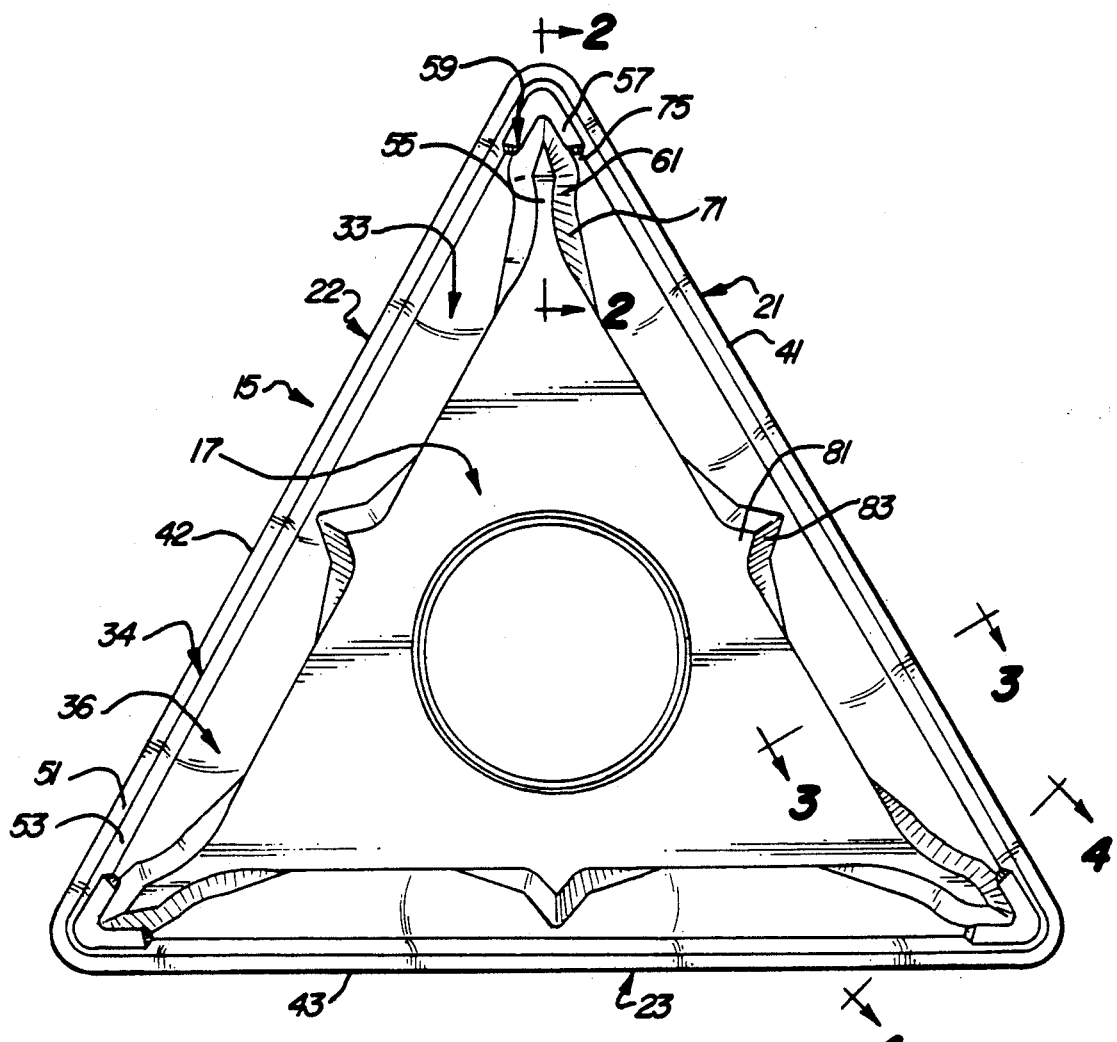
FIG. 1 is a top-elevational view of an embodiment of an insert of the present invention.
Figure 2:
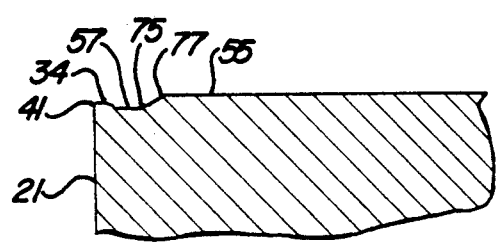
FIG. 2 is a partial sectional view of a corner chip breaker along section 2—2 of FIG. 1.
Figure 3:
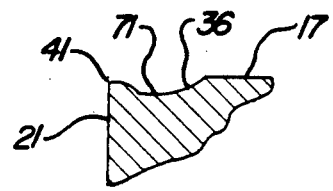
FIG. 3 is a partial sectional view of a chip breaker along a portion of section 3—3 of FIG. 1.
Figure 4:
FIG. 4 is a detailed sectional view of a raised land along section 4—4 of FIG. 1.

As shown in FIG. 1, the cutting insert 15 includes a pair of spaced parallel faces with peripheral side surfaces 21-23 positioned therebetween. One face which forms an island is shown at 17 while the other face is not shown in the figure. The peripheral side surfaces 21-23 which lie in respective planes substantially normal to the parallel faces form straight cutting edges 41-43 which substantially lie in a cutting plane positioned just below a respective face 17. The side surfaces 21 to 23 form adjacent side surfaces which merge at the rounded corners 25-27 of the insert 15. The rounded cutting corners 25-27 for finishing operations generally a have a radius of less than 0.04, preferably less than 0.03 and more preferably less than about 0.015 inch for enhancing the accuracy of finishing operations. Pairs of adjacent side surfaces, for example 21 and 22, have an included angle of less than 90 degrees to obtain the desired clearance desired for finishing operations. Polygonal shapes such as triangular or rhomboidal are preferred for obtaining indexability. The side clearance angle at the corners is preferably less than 90 degrees. This angle is the included angle between respective side surfaces and is preferably less than 85 degrees.

For mounting purposes, the insert 15 may be provided with a opening 35 extending entirely through the insert 15 from the one face 17 to the other face. In the interior region, the opening 35 has straight sides extending in a direction normal to the faces. In the region adjacent a respective face, the opening bevels outwardly for accommodating the head of a threaded screw which can be used to provide secure attachment of the insert 15 to a tool.

For purposes of the following discussion, inwardly or the inward direction is toward the center of the insert while outwardly or the outward direction is in a direction away from the center of the insert. With reference to chip flow over a cutting edge, the radial direction is generally perpendicular to the cutting edge while the axial direction is parallel to the cutting edge. Unless specifically mentioned otherwise, the various angles referred to are with reference to the plane of an adjacent face surface. Also, dimensions are in inchs unless otherwise specified.

The cutting edges 41-43 may be slightly beveled or rounded to reduce cracking when the edge impacts the work to be cut. To break the chips formed during cutting, a chip breaker recess 33 extents rearwardly away from and along the cutting edges 41-43 around the periphery of the insert 15. The chip breaker recess 33 includes a descending control surface 34 leading to the bottom of the chip breaker recess 33 followed by an ascending control surface 36 leading to the central island 17. The ascending control surface 36 directs the chip upwardly toward a respective one of the parallel faces and away from the insert 15 and the cutting edge.

As generally illustrated in the drawings, the descending control surface 34 comprises a first descending control surface 51 and a second descending control surface 53 with the first surface being at a shallow angle and the second surface being at a steep angle. The raised land 55 extending outwardly toward a corner 25 from the central island 17 along a bisector of a respective corner 25 and a raised corner bottom control surface 57 extending above the bottom of the remaining portion of chip breaker recess 33 and around the corner 25 form an additional shallow chip control recess 59. The shallow recess 59 is formed by additional chip control surfaces which include an ascending corner chip control surface 61 extending upwardly from the raised corner bottom control surface 57 to the raised land 55 at a relatively steep angle. In the corner area, a descending corner chip control surface which extends downwardly from the cutting edge 42 at the corner 25 is formed by a portion of the descending control surface 34. The shallow recess 59 merges with a remaining portion of the chip breaker recess 33 and is configured to change the curling motion of the chip at light depths of cut to enhance the chip breaking forces. Since the corners of the insert are identical in construction, it is believed that a description of only one, as set forth above and below, will suffice.

The first descending control surface 51 is planar and extends inwardly from the cutting edge 42 at a shallow angle to add strength to the cutting edge 42. The angle is from about 9 to about 15 degrees and preferably at about 12 degrees as measured with reference to the island 36. The second descending control surface 53 is planar and extends inwardly from the first descending control surface 51 to the bottom of the chip breaker recess 33 at a steep angle of from about 22 to about 32 degrees and preferably at about 27 degrees The first descending control surface 51 at a shallow angle lifts the chip at low ranges of feed and depth of cut. At higher ranges, the steeper second descending control surface 53 interrupts the continuous motion of the chip to promote curling. The width of the descending control surface 34 is from about 0.015 to about 0.04 inch, preferably about 0.0250. In the corner area, the width of the descending control surface 34 is from about 0.015 to about 0.02 inch, preferably about 0.0185. The bottom of the chip breaker recess 33 along the main portion of the chip breaker includes a bottom flat control surface 71 parallel to the respective face or island 17 at a distance of about 0.01 to about 0.02 from the island or preferably a distance of about 0.0152. The width of the bottom flat control surface 71 is from about 0.01 to about 0.015 and preferably about 0.0126 inch. The ascending control surface 36 is curved concave backwall joining the bottom flat control surface 71 to the island 17 and having a radius of from about 0.05 to about 0.1 inch and preferably about 0.075 inch.

The ascending corner chip control surface 61 has a width of from about 0.015 to about 0.03 and preferably about 0.023 inch as measured along a bisector of a respective corner. The ascending corner chip control surface 61 comprises a first ascending corner chip control surface 75 and second ascending corner chip control surface 77. The first surface 75 extends upwardly from the raised corner bottom chip control surface 57 at a relatively steep angle of from about 33 to about 47 degrees, preferable at an angle of about 40 degrees. The second surface 77 extends upwardly from the first surface 75 to the raised land 55 formed as part of the island 17 at a less steep angle of from about 15 to about 31 degrees, preferable at an angle of about 23 degrees. At the corner most position, the first surface 75 joins the raised corner bottom chip control surface 57 while the rearward portion joins the ascending control surface 34. The ascending corner chip control surface 61 is present at the corner nose section of the insert 15 in the form of a pear shaped head which extends a distance of about 0.070 inch from the central island 15 and along the bisector of a respective corner. The ascending corner chip control surface 61 adds strength to the nose or corner area and enhances the strain level to impart curl to a chip with a sufficiently large radius in such a manner so as to promote breakage of the chip.

The additional corner chip control surfaces formed by the raised corner bottom control surface 57 extending above the raised corner bottom chip control surface 57 and around the corner include a raised corner bottom chip control surface 57. The raised corner bottom chip control surface 57 comprises a flat surface substantially parallel to a respective face and extends from the descending control surface 34 to the ascending corner chip control surface 61. The raised corner bottom chip control surface 57 which has a width of from about 0.015 to about 0.025 and preferably about 0.0215 inch is preferably at a depth of about 0.00523 as measured from the cutting edge or about 0.0119 as measured from the island. The shallow chip control recess 59 formed in the corner area by the raised corner bottom chip control surface 57 promotes a change in the curling motion of chips to promote breakage.

The portion of the chip breaker recess 33 formed by the descending control surface 34 and the ascending control surface 36 merges with shallow chip control recess 59 in the corner or nose area of the chip breaker recess 34. The shallow chip control recess 59 is formed by the additional corner chip control surfaces which is in turn formed by the raised land 55 and raised bottom surface 57. The island 17 is preferably higher than the cutting edge 42 and most preferably the island is about 0.0067 inch higher than the cutting edge 42. The narrow chip breaker recess at the nose and the difference in heights of the various chip breaker control surfaces enhance the chip breaking effect at low ranges of feed and depth of cut.

Intermediate the corners, a raised intermediate land 81 extends outwardly from the island 17 into the chip breaker recess 34. The raised intermediate land 81 which has a triangular shape includes an intermediate ascending control surface 83 extending closely adjacent the descending control surface 34 and merging with the ascending control surface 36. The intermediate ascending control surface 83 extends upwardly at an angle of from about 30 to about 50 degrees, preferable at an angle of about 40 degrees.

Figure 5:
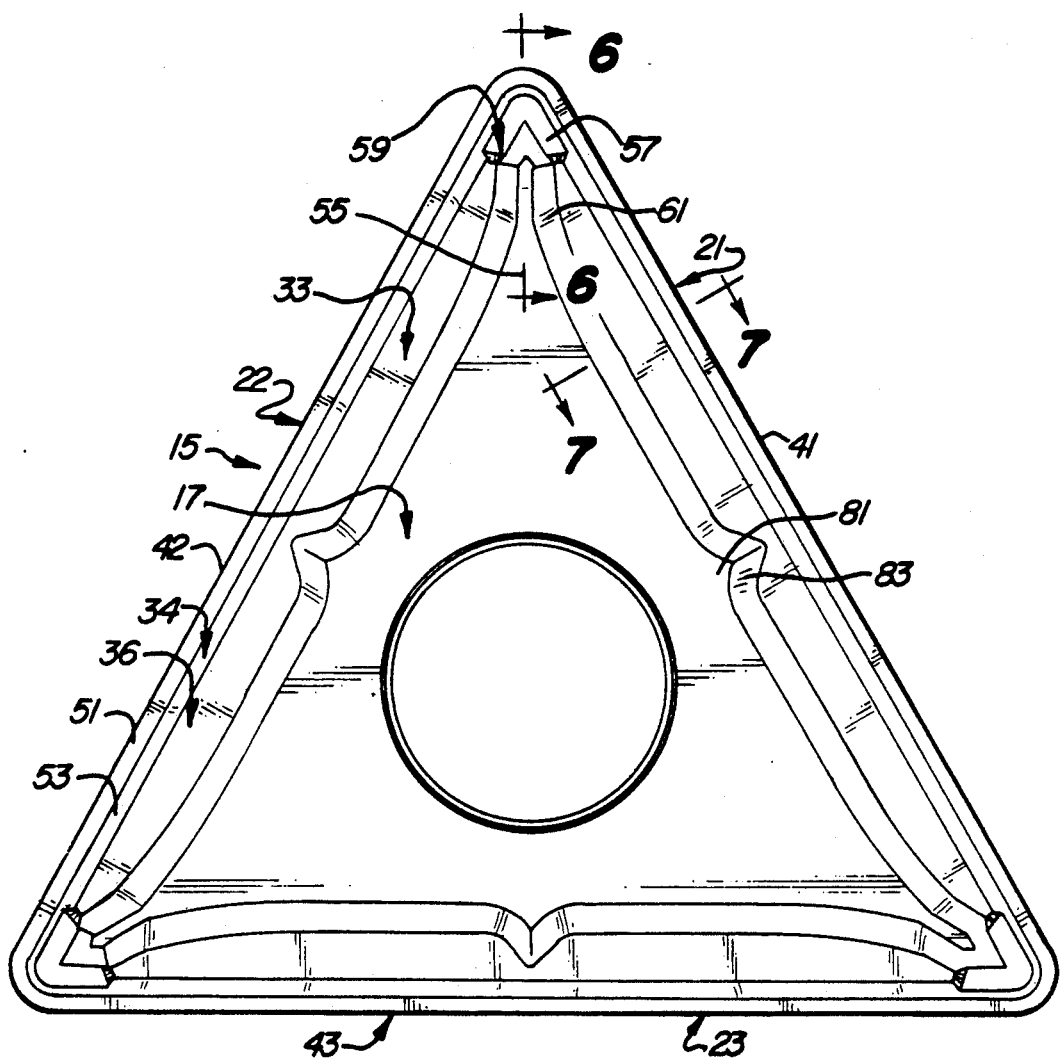
FIG. 5 is a top-elevational view of another embodiment of an insert of the present invention.

According to an embodiment illustrated in FIGS. 5 to 7, the first descending control surface 51 is planar as previously described with reference to the embodiments shown in FIGS. 1 to 4. The second descending control surface 53 extends inwardly from the first descending control surface 51 at a steep angle. As illustrated, a concave portion of the second surface 53 may be formed by an arc with the cord of the arc being at an angle of about 27 degrees to the bottom flat control surface 71 or the island 17. In FIG. 7, the concave portion of the second descending control surface 53 is formed by a radius of about 0.0431 inch. The bottom flat control surface 71 is parallel to the respective face or island 17 and extends to the ascending control surface 36. The ascending control surface 36 is a straight planar backwall joining the bottom flat control surface 71 to the island 17.

Figure 6:
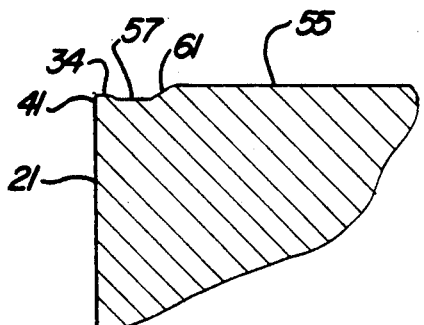
FIG. 6 is a partial sectional view of a corner chip breaker along section 6—6 of FIG. 5.
Figure 7:
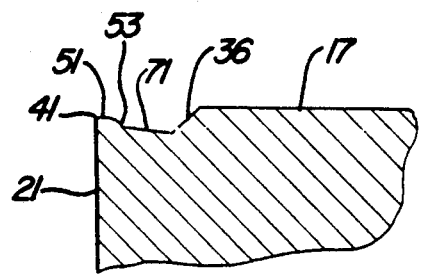
FIG. 7 is a partial sectional view of a chip breaker along a portion of section 7—7 of FIG. 5.

The embodiment illustrated in FIG. 6, includes the additional corner chip control surfaces formed by a raised land 55 and includes an ascending corner chip control surface 61 extending upwardly at an angle of about 40 degrees from the raised corner bottom chip control surface 57. The ascending corner chip control surface 61 follows the contours of the cutting edges 41 and 42 forming a 60 degree angle at corner 25 of the insert 15. The raised land 55 includes a pair of leg portions which extend raised land 55 outwardly along the bisector of a respective corner 25.

Figure 8:
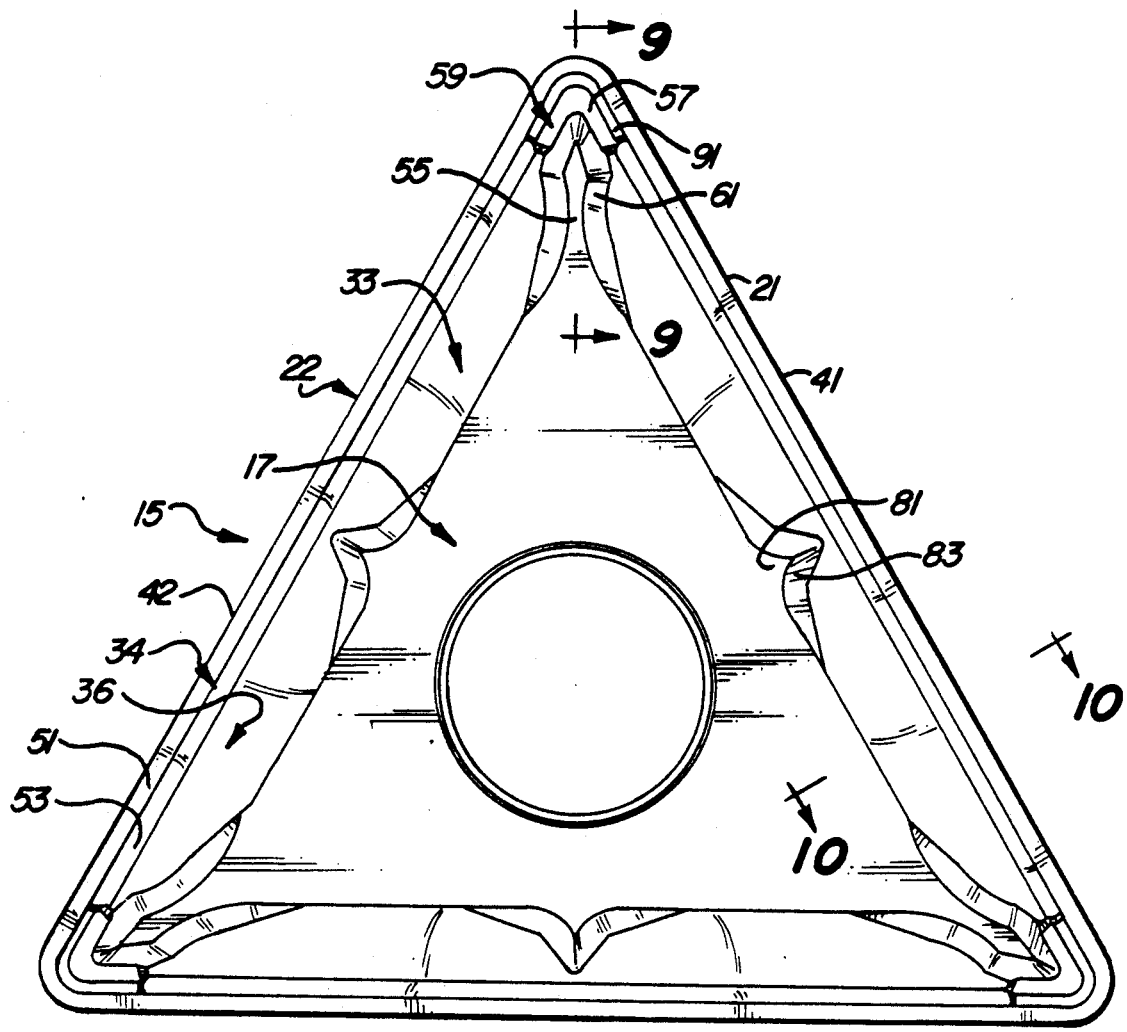
FIG. 8 is a top-elevational view of another embodiment of an insert of the present invention.
Figure 9:
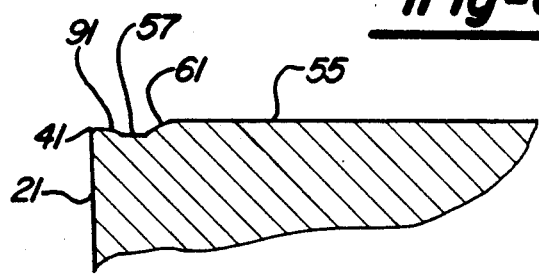
FIG. 9 is a partial sectional view of a corner chip breaker along section 9—9 of FIG. 8.
Figure 10:
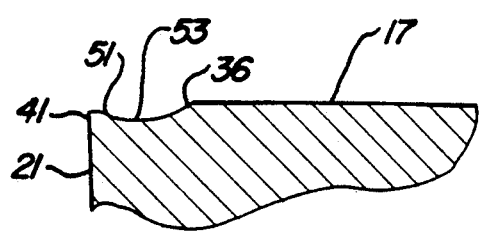
FIG. 10 is a partial sectional view of a chip breaker along a portion of section 10—10 of FIG. 8.

According to the preferred embodiment of the invention illustrated in FIGS. 8 to 10, the raised corner bottom control surface 57 which has a width of about 0.029 inch includes a projection 91 directly adjacent the ascending chip control surface 36. The projection 91 as illustrated in the drawings has a convex shape in the form of a ridge. The purpose of the raised projection is to promote the lifting of chips to enhance chip breakage and strengthen the nose or corners. The width of the raised projection in the most preferred embodiment is about 0.0089 inch.

Figure 11:
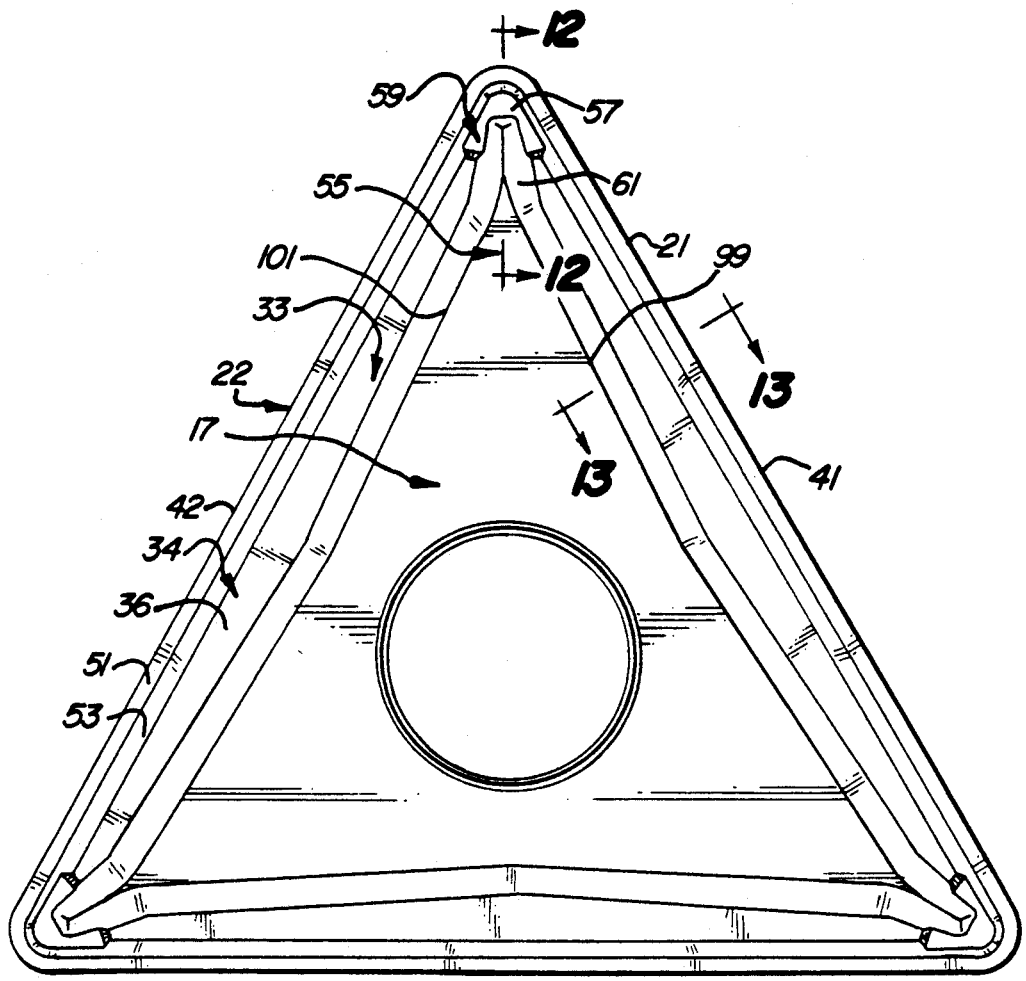
FIG. 11 is a top-elevational view of another embodiment of an insert of the present invention.

According to the preferred embodiment of the invention illustrated in FIGS. 11 to 13, the descending control surface 34 comprises a first and second descending control surfaces 51 and 53 as described with reference to FIG. 13. The bottom of the chip breaker recess includes a concave control surface 93 extending to the flat bottom control surface 71. The concave portion having a radius of about 0.0610 joins the flat portion having a width of about 0.037 inch which in turn joins the ascending control surface 36. The lowermost portion of the bottom control surface 71 is at a distance of about 0.01 to about 0.25 from the island or preferably a distance of about 0.0188. This latter distance corresponds with a distance of 0.0122 inch from the cutting edge 42. The width of the flat bottom control surface 71 is shown as being about 0.0126 inch. The ascending control surface 36 which is a straight flat planar backwall joining the bottom control surface 71 to the island 17 has an angle of from about 30 to about 50 degrees, preferable an angle of about 40 degrees.

Figure 12:
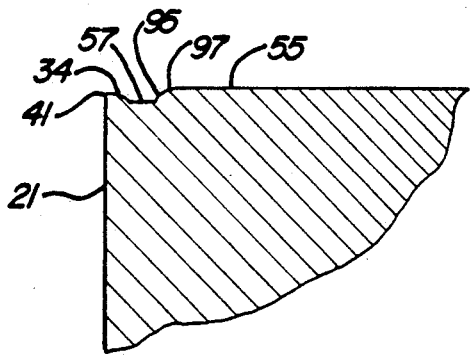
FIG. 12 is a partial sectional view of a corner chip breaker along section 12—12 of FIG. 11.
Figure 13:
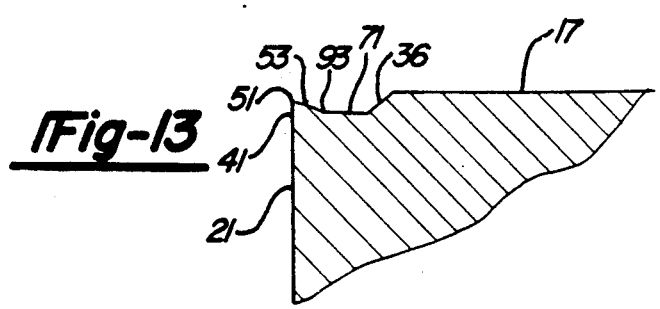
FIG. 13 is a partial sectional view of a chip breaker along a portion of section 13—13 of FIG. 11.

As shown in FIG. 12, the ascending corner chip control surface 61 includes a first ascending corner chip control surface 95 joining a second ascending corner chip control surface 97. The first surface 95 extends upwardly at the angle previously described with respect to the ascending corner chip control surface 61 and the second surface 97 extends upwardly at an angle of from about 3 to about 9 degrees, preferable at an angle of about 6 degrees from the first corner ascending control surface 95 to the top of the raised land 55 which is at an elevation comparable to the island 17. The ascending corner chip control surface 61 is present at the corner nose section of the insert in the form of a triangular shaped head. The raised corner bottom chip control surface 57 which has a width of from about 0.015 to about 0.025 and preferably about 0.0215 inch is preferably at a depth of about 0.0052 as measured from the cutting edge 42 or about 0.0119 as measured from the island 17.

The island 17 is preferably higher than the cutting edge 42 as previously discussed. The junction 99 of the island 17 and the ascending chip control surface 36 tapers inwardly away from a respective corner 25 and the cutting edges 41 and 42 toward the center of the insert 15 so that the chip breaker recess 33 becomes wider toward the center of the insert 15. The inward taper is such that the angle between adjacent junctions 99, 101 is from about 5 to about 20 degrees less than the included angle of the corner. In FIG. 11, the included angle is shown as being about 52 degrees.

While there have been shown and described what are at present believed to be the preferred embodiments of the present invention, it will be obvious to those of ordinary skill in the art that various changes and modifications may be made therein without departing from the spirit and scope of the invention as defined by the appended claims.

We claim:

1. A indexable cutting insert of the type having a corner radius and a corner angle adapted for finishing operations comprises a pair of substantially parallel spaced apart faces and a plurality of peripheral side surfaces being substantially normal to said faces, a plurality of straight cutting edges positioned in a plane closely adjacent and below the plane of a respective face, adjacent pairs of cutting edges forming corners and extending away from corners at the junction of said plane and said respective peripheral side surfaces, a chip breaker recess extending along a respective cutting edge and including a descending control surface and an ascending control surface, said descending control surface comprises a first and second planar descending control surfaces, said first planar descending control surface being at a shallow angle and said second planar descending control surface being at a steep angle, said chip breaker recess comprising a shallow corner chip control recess formed by said descending control surface and additional chip control surfaces, said additional chip control surfaces being formed by a raised land extending outwardly toward a corner from the central island along a bisector of a respective corner and a raised bottom surface extending around said raised land in said corner above the bottom of a remaining portion of said chip breaker recess, said raised bottom surface being a ridge having an outwardly projecting convex shape, said raised land including an ascending corner chip control surface extending upwardly from the raised bottom surface at a relatively steep angle for enhancing the curling motion of the chips at light depths of cut to enhance the chip breaking forces.

2. An indexable cutting insert according to claim 1 wherein said faces form respective islands.

3. An indexable cutting insert according to claim 1 wherein said rounded cutting corners preferable have a radius of less than about 0.015 inch for enhancing the accuracy of finishing operations.

4. An indexable cutting insert according to claim 1 wherein said insert has a triangular or rhomboidal shape with a side clearance angles less than 85 degrees.

5. An indexable cutting insert according to claim 1 wherein said cutting edges have a slightly beveled or rounded edge for reducing cracking when the edge impacts the work to be cut.

6. An indexable cutting insert according to claim 1 wherein said chip breaker recess extents rearwardly away from and along said cutting edges entirely around the periphery of said insert.

7. An indexable cutting insert according to claim 1 wherein said first descending control surface extends inwardly from the cutting edge at a shallow angle from about 9 to about 15 degrees.

8. An indexable cutting insert according to claim 1 wherein said second descending control surface extends inwardly from the first descending control surface to the bottom of the chip breaker recess at a steep angle of from about 22 to about 33 degrees.

9. An indexable cutting insert according to claim 8 wherein said width of the descending control surface is from about 0.015 to about 0.04 inch.

10. An indexable cutting insert according to claim 1 wherein said bottom flat control surface has a width of from about 0.01 to about 0.02.

11. An indexable cutting insert according to claim 1 wherein said raised corner bottom control surface has a width of from about 0.015 to about 0.025.

* * * * *